United States Patent
Akiyama et al.

(10) Patent No.: US 7,588,831 B2
(45) Date of Patent: Sep. 15, 2009

(54) OIL-RESISTANT SHEET MATERIAL

(75) Inventors: Kousuke Akiyama, Sunto-gun (JP); Yasuhiko Asai, Sunto-gun (JP)

(73) Assignee: Tokushu Paper Mfg. Co. Ltd., Shizuoka (JP)

( * ) Notice: Subject to any disclaimer, the term of this patent is extended or adjusted under 35 U.S.C. 154(b) by 64 days.

(21) Appl. No.: 10/562,826

(22) PCT Filed: Aug. 10, 2004

(86) PCT No.: PCT/JP2004/011464

§ 371 (c)(1),
(2), (4) Date: Dec. 30, 2005

(87) PCT Pub. No.: WO2005/014930

PCT Pub. Date: Feb. 17, 2005

(65) Prior Publication Data

US 2007/0087190 A1 Apr. 19, 2007

(30) Foreign Application Priority Data

Aug. 11, 2003 (JP) ............................. 2003-291215

(51) Int. Cl.
 *B32B 27/00* (2006.01)
 *B32B 29/00* (2006.01)
(52) U.S. Cl. ...................... 428/532; 428/500
(58) Field of Classification Search ........................ None
See application file for complete search history.

(56) References Cited

U.S. PATENT DOCUMENTS 5,538,668 A * 7/1996 Hendriks ................... 516/133
6,090,871 A * 7/2000 Reiners et al. ................ 524/27
2002/0015854 A1 * 2/2002 Billmers et al. ............. 428/500

FOREIGN PATENT DOCUMENTS

| JP | 6-2373 | 1/1994 |
|---|---|---|
| JP | 8-209590 | 8/1996 |
| JP | 9-3795 | 1/1997 |
| JP | 9-501745 | 2/1997 |
| JP | 9-111693 | 4/1997 |
| JP | 10-259590 | 9/1998 |
| JP | 11-21800 | 1/1999 |
| JP | 2000-26601 | 1/2000 |
| JP | 2001-115121 | 4/2001 |
| JP | 2001-303475 | 10/2001 |
| JP | 2001-336090 | 12/2001 |
| JP | 2002-69889 | 3/2002 |
| JP | 2003-515015 | 4/2003 |
| JP | 2004-59812 | 2/2004 |
| JP | 2004-68180 | 3/2004 |

* cited by examiner

*Primary Examiner*—Sheeba Ahmed
(74) *Attorney, Agent, or Firm*—Wenderoth, Lind & Ponack, L.L.P.

(57) ABSTRACT

An oil-resistant sheet material which has low resistance to gas permeation and excellent oil resistance and is suitable especially for use as a packaging material for foods containing an edible oil. The oil-resistant sheet material is obtained by forming at least one coating layer from a material comprising a hydrophobized starch and a crosslinking agent on at least one side of a base in an amount of 0.5 to 20 g/m². By incorporating a fatty acid and/or polyvinyl alcohol into this coating layer, oil resistance is improved. A coating layer comprising a fatty acid as the main component or a coating layer comprising polyvinyl alcohol as the main component may be formed on that coating layer. Thus, a coating layer composed of at least two layers may be formed.

10 Claims, No Drawings

OIL-RESISTANT SHEET MATERIAL

TECHNICAL FIELD

The present invention relates to a sheet material excellent in oil resistance and grease resistance. More specifically, it relates to a sheet material suitable for use as a packaging material for food containing edible oil, such as fried food and the like.

BACKGROUND ART

Conventionally, in order to impart oil resistance to paper, an approach has been taken to make the critical surface tension of a treated surface smaller than the surface tension of an oily substance. Chemicals with such function are called oil-resistant agents, and oil-resistant paper treated with a fluorine-based oil-resistant agent has been mainly used.

For example, as Patent Document 1 presents a fluorine-based oil-resistant agent as a novel oil-resistant agent, those in which a fluorine-based compound such as acrylate or phosphoric ester of perfluorocarbon is used have been mainly used because they are inexpensive and effective.

In the case of oil-resistant paper using a fluorine-based oil-resistant agent, no coating needs to be formed because the oil-resistant agent itself has excellent oil repellency and strong water repellency, and thus the oil-resistant paper is able to have a lowered resistance to air permeability.

Recently, however, it has been revealed that when fried food is wrapped with such oil-resistant paper using an oil-resistant agent of a fluorine-based compound and heated up in an electronic oven at a high temperature of 100° C. or more, harmful gas (fluoroalcohol gas, hydrogen fluoride, etc.) that can be accumulated in the human body is generated, and thus use of the fluorine-based oil-resistant agent has posed a serious problem. It is also pointed out that even without heating by the electronic oven, similar gas may be generated when such paper is used for packaging a food material having a temperature of 100° C. or more.

In addition, fluorine-based organic compounds have extremely poor biodegradability and there is a global concern for pollution due to these substances. As above-described, due to such danger to human health and impact on global environment, use of fluorine-based compounds now poses serious social problems.

As oil-resistant paper in which no fluorine-based compound is used, Patent Document 2 proposes an oil-resistant container prepared by applying a silicone resin and an adhesive for heat sealing to a barrier layer containing crosslinked polyvinyl alcohol and/or starch and a water resistant additive as main components and then forming the material into a container. This oil-resistant container did not always have satisfactory oil resistance and had a problem that the cost of the container was high because silicone resin was expensive.

Further, Patent Document 3 proposes an oil-resistant paper prepared by applying a coating layer containing nonionic or cationic polyvinyl alcohol and a coating layer containing a fluorine-based oil-resistant agent in that order. However, the coating layers containing polyvinyl alcohol and starch employed in this document have a role of preventing permeation of the fluorine-based oil-resistant agent into paper, which is quite different from the subject matter of the present invention.

Patent Document 4, Patent Document 5 and Patent Document 6 propose oil-resistant paper using acrylic emulsion as an oil-resistant agent. However, these kinds of oil-resistant paper require a thick acrylic resin coating for satisfying desired properties, and this resulted in an extremely high resistance to air permeability and properties as a food packaging material were lost. When a food packaging material has a high resistance to air permeability and food is heated or kept warm within the packaging material, the inside of the package is filled with vapor generated from food, and there may be a case that food is moistened with condensed dew and quality and taste of the food is remarkably degraded. In addition, when the food is heated again in an electronic oven still being wrapped with the packaging material, rapidly generated vapor cannot escape to the outside and the package may be broken. Moreover, in order to form a coating having sufficient oil resistance, a large amount of coating must be applied and this has resulted in a problem of high costs of packaging materials.

On the other hand, in order to ensure high oil resistance, lamination of film has been generally practiced. However, when film is laminated, resistance to air permeability becomes extremely high, and the resulting packaging material was defective as described above.

To prevent the resistance to air permeability becoming extremely high, Patent Document 7 proposes an air-permeable oil-resistant sheet comprising a substrate such as paper having pores and a thermoplastic film having pores similar to that of the substrate laminated on at least one side of the substrate. It is also proposed to form a laminate of non-woven fabric and paper. However, such sheets cannot fully prevent edible oil from bleeding to the outside, and excellent oil resistance has not been achieved.

Patent Document 8 proposes oil-resistant paper using a hydrophobically modified starch, i.e. hydorophobized starch, but the oil resistance of this paper was not always satisfactory. To achieve sufficient oil resistance by using only the hydrophobized starch, an enormous amount of hydrophobic starch must be applied, and this is impractical in terms of the cost. In addition, increase in resistance to air permeability due to the increased coating amount was also a problem. Further, in the case of using the hydrophobized starch alone, starch is easily soluble in water, and when the material is used as a food packaging material, starch is dissolved in hot water and stains the food.

Patent Document 9 proposes oil-resistant paper coated with an oil-resistant agent in which polyvinyl alcohol is used or polyvinyl alcohol and crosslinking agent are used together. This invention accomplishes high oil resistance in small coating amounts, but because polyvinyl alcohol is used, resistance to air permeability was not satisfactory although it could be kept lower as compared to those of other oil-resistant agents containing no fluorine. Further, coating using a size press involved a problem of contamination of dryers.

In addition, a fatty acid sizing agent for internal addition is known to improve oil resistance, but this oil resistance means just to prevent strike through of ink at the time of offset printing, and is remarkably lower than the oil resistance required in food packaging materials as defined in the present invention. Thus, use of the fatty acid sizing agent for oil-resistant paper has not been studied. Further, the mechanism of producing oil resistance by using the fatty acid sizing agent is quite different from that of the present invention. Moreover, the fatty acid sizing agent is generally used as an internal additive to improve Stockigt sizing degree, and hardly added to a coating layer, and yet, addition thereof to a coating solution for improving oil resistance has not been studied at all.

As described above, prior arts have not produced oil-resistant paper suitable as food packaging materials simultaneously satisfying oil resistance, resistance to air permeability and productivity.

[Patent Document 1]: Japanese Patent Laid Open No. 12-026601
[Patent Document 2]: Japanese Patent Publication No. 6-2373
[Patent Document 3]: Japanese Patent Laid Open No. 8-209590
[Patent Document 4]: Japanese Patent Laid Open No. 9-3795
[Patent Document 5]: Japanese Patent Laid Open No. 9-111693
[Patent Document 6]: Japanese Patent Laid Open No. 2001-303475
[Patent Document 7]: Japanese Patent Laid Open No. 11-021800
[Patent Document 8]: Japanese Patent Laid Open No. 2002-69889
[Patent Document 9]: Japanese Patent Laid Open No. 2004-68180

DISCLOSURE OF THE INVENTION

An object of the present invention is to solve the problem of safety to humans and environment caused by use of conventional fluorine-based oil-resistant agents and the problem of high resistance to air permeability and high cost of oil-resistant paper to which oil resistance is imparted by an oil-resistant agent containing no fluorine. More specifically, an object of the present invention is to provide an oil-resistant sheet material having low resistance to air permeability, harmless to humans and excellent in oil resistance and productivity.

According to first embodiment of the present invention, there is provided an oil-resistant sheet material characterized in that at least one coating layer containing a hydrophobized starch and a crosslinking agent is formed on at least one side of a substrate in an amount of 0.5 to 20 g/m².

The invention of the second embodiment of the present invention is an oil-resistant sheet material characterized in that the coating layer as defined in claim 1 further contains fatty acid and/or polyvinyl alcohol.

The invention of the third embodiment of the present invention is an oil-resistant sheet material characterized in that at least two coating layers comprising the coating layer as defined in claim 1 or 2 and a coating layer containing polyvinyl alcohol as a main component are formed on at least one side of a substrate.

The invention of the fourth embodiment of the present invention is an oil-resistant sheet material characterized in that at least two coating layers comprising the coating layer as defined in claim 1 or 2 and a coating layer containing fatty acid as a main component are formed on at least one side of a substrate.

The invention of the fifth embodiment of the present invention is an oil-resistant sheet material characterized in that at least two coating layers comprising the coating layer as defined in claim 1 or 2 disposed nearer to the substrate and a coating layer containing fatty acid as a main component disposed farther from the substrate are formed on at least one side of the substrate.

The invention of the sixth embodiment of the present invention is the oil-resistant sheet material according to any one of claims 1 to 5, wherein the substrate contains a hydrophobized starch in a proportion of 1 to 15% by weight based on the total weight of the substrate.

The invention of the seventh embodiment of the present invention is an oil-resistant sheet material characterized in that a hydrophobized starch, a crosslinking agent and fatty acid are internally added to a substrate.

The invention of the eighth embodiment of the present invention is the oil-resistant sheet material according to any one of claims 1 to 7, wherein the crosslinking agent is an epichlorohydrin-based crosslinking agent.

The invention of the ninth embodiment of the present invention is the oil-resistant sheet material according to any one of claims 2 to 8, wherein the fatty acid is a fatty acid sizing agent.

The invention of the tenth embodiment of the present invention is, wherein the fatty acid is modified by an epichlorohydrin-based chemical.

BEST MODE FOR CARRYING OUT THE INVENTION

It is essential that a hydrophobized starch used in the present invention is crosslinked by addition of a crosslinking agent. By subjecting the hydrophobized starch to crosslinking, oil resistance unexpected in the case of using the hydrophobized starch alone can be obtained. It has been conventionally known that addition of a crosslinking agent to a non-hydrophobized starch improves film-forming property and has an effect of preventing permeation of water and the like. However, since there is little difference between the resistance to air permeability of the hydrophobized starch alone and that of the hydrophobized starch to which a crosslinking agent is added, the reason of improvement in oil resistance due to addition of a crosslinking agent to the hydrophobized starch is considered to be not because of improvement in film-forming property but because of some action occurring between the hydrophobized starch and the crosslinking agent. In addition, in the case of the non-hydrophobized starch, there is no remarkable improvement in oil resistance even if a crosslinking agent is added, and the oil resistance is insufficient for use as an oil-resistant sheet material. From these facts, significant improvement in oil resistance of a sheet material in which a coating layer obtained by adding a crosslinking agent to the hydrophobized starch is formed on a substrate was totally unpredictable.

It is essential that the starch used in the present invention is hydrophobized, i.e. hydrophobically modified, and any starch may be used as long as it is hydrophobized. Methods of hydrophobization of starch include a method in which starch is closely contacted with aqueous organosilane in the presence of alkali aluminate or alkali hydroxide, a method of forming a derivative with silicone or alkenyl, a method in which starch is allowed to react with organic acid anhydride such as octenyl succinic anhydride, dodecenyl succinic anhydride and the like in an aqueous system, a method in which a hydrophobic monomer such as acrylonitrile or a hydrophobic unsaturated monomer is copolymerized with starch, a method of adding hydrophobic group containing a hydrocarbon group to starch by etherification or esterification, and a method of forming alkyl starch succinate, but the method is not limited to these. In particular, the hydrophobized starch obtained by reacting starch with organic acid anhydride in an aqueous system to modify the starch by a hydrocarbon group having 6 to 22 carbon atoms is preferably used because excellent oil resistance can be produced due to the reaction with the crosslinking agent. The reason why the oil resistance of only the hydrophobized starch is remarkably improved by crosslinking is assumed to be because a hydrophobic group bonded to starch is involved in some action with the crosslinking agent.

Materials of starch to be hydrophobized include tapioca starch, potato starch, corn starch, potato starch, wheat starch, rice starch and the like, but are not limited to these. In particular, the hydrophobized starch obtained from tapioca starch can yield high oil resistance by addition of a crosslinking agent.

The crosslinking agent used in the present invention is not particularly limited as long as it is capable of crosslinking the hydrophobized starch. Examples of the crosslinking agent include glyoxal, dialdehyde, polyacrolein, N-methylol urea, N-methylol melamine, an activated vinyl compound, various esters and diisocyanate. In consideration of economical efficiency, reaction stability and effects on food, epoxy compounds such as epichlorohydrin are preferably used.

The crosslinking agent is added to the hydrophobized starch in a solid content of preferably 1 to 30% by weight, more preferably 5 to 15% by weight based on the weight of the solid of the hydrophobized starch. When the proportion is less than 1% by weight, there may be no sufficient effect, and when the proportion is more than 30% by weight, an effect comparable to the amount added cannot be obtained, and this is disadvantageous in terms of the cost. When the amount of the crosslinking agent is too large, the proportion of the hydrophobized starch relative to the entire coating is small, and the oil resistance is thus decreased.

The coating layer containing the hydrophobized starch and the crosslinking agent needs to be formed on at least one side of a substrate in an amount of 0.5 to 20 $g/m^2$. When the amount is less than 0.5 $g/m^2$, sufficient oil resistance cannot be achieved. When the amount is more than 20 $g/m^2$, oil resistance does not increase despite the coating amount and this is disadvantageous in terms of the cost. Upon coating, size press coating is extremely advantageous in terms of the cost, and in the case of size press coating, the coating amount is preferably 0.5 to 7 $g/m^2$. When the coating amount is more than 7 $g/m^2$, dryers may be contaminated. Such coating layer may be formed on both sides of the substrate according to need, and in that case, the coating amount is adjusted so that the total of the coating layers on both sides falls into the above-described coating amount range.

When a coating layer obtained by adding fatty acid to the coating layer containing the hydrophobized starch and the crosslinking agent is formed on the substrate of a sheet material, the oil resistance of the sheet material is remarkably improved. Although the reason is not clear, since the sheet material has little oil resistance when fatty acid alone is applied to the substrate, it is assumed that the three components of the fatty acid, the hydrophobized starch and the crosslinking agent are involved in some action to improve the oil resistance of the sheet material.

The fatty acid used in the present invention may basically contain a fatty acid component, or may be a modified fatty acid or a fatty acid salt. For example, fatty acid amides derived from fatty acid and fatty acid esters produced from fatty acid and alcohol may also be used. Examples of the fatty acid include saturated fatty acid, unsaturated fatty acid, distilled fatty acid and hydrogenated fatty acid. These fatty acids are preferably emulsified or saponified so as to be coated, but they need not be emulsified or saponified as long as they can be coated, for example, after heating and melting. In addition, vegetable fatty acid and animal fatty acid may also be used.

The fatty acid modified to cations has been widely used as a fatty acid sizing agent for papermaking. Fatty acid sizing agents include those in which a cationic fixing agent such as a polyamine-based chemical is added to fatty acid, fatty acid salt and fatty acid modified to impart functionalities, and further include fatty acid epoxidized by an epichlorohydrin-based chemical. Any of these sizing agents containing fatty acid may be used as the fatty acid in the present invention.

The fatty acid used in the present invention has a melting point of preferably 20° C. or higher, more preferably 40° C. or higher. When the coating layer containing fatty acid having the melting point is lower than 20° C. is applied to the substrate to form a sheet material, the sheet material becomes oily and difficult to handle. When the sheet material containing fatty acid having the melting point is lower than 40° C. is used as a food packaging material, there is a possibility that the fatty acid is melted upon heating or during keeping warm and the oil resistance is lowered.

By using fatty acid modified by an epichlorohydrin-based chemical as the fatty acid used in the present invention, the oil resistance of the sheet material can be improved. Here, modification by epichlorohydrin not only means simple introduction of an epichlorohydrin group to fatty acid but also include bases where epichlorohydrin is added to fatty acid in any manner, for example, by using epichlorohydrin as a dispersant for fatty acid.

The fatty acid is added to the coating layer in a solid content of preferably 1 to 50% by weight, more preferably 3 to 15% by weight based on the total weight of the solid of the coating layer. When the proportion is less than 1% by weight, there may be no sufficient effect, and when the proportion is more than 50% by weight, increase in oil resistance is not comparable to the amount added, and this is disadvantageous in terms of the cost. When the proportion of the fatty acid is too large, the proportion of the hydrophobized starch and the crosslinking agent in the coating layer is decreased and the oil resistance of the sheet material is decreased. In addition, a sheet material obtained by applying a coating layer to which the fatty acid is added to the substrate tends to be slippery, but when more than 50% by weight of the fatty acid is added to the coating layer, the sheet material becomes too slippery and difficult to handle.

When the coating layer contains fatty acid, this fatty acid serves as a releasing agent and also produces an effect of preventing contamination of dryer upon coating using a size press. In other words, addition of fatty acid to the coating layer improves the oil resistance of the obtained sheet material and at the same time brings about an effect of preventing contamination of dryer, whereby productivity is greatly improved.

Further, by incorporating fatty acid into the substrate of a sheet material in consideration of the function of fatty acid as a releasing agent, and when the sheet material is used as a packaging material of fried food such as fried chicken, releasing properties between the food material and the packaging material are improved, and adhesion of skin of fried chicken to the packaging material can be effectively prevented.

Upon addition of the fatty acid to the hydrophobized starch and the crosslinking agent, agglomeration may occur when fatty acid modified by an epichlorohydrin-based chemical is used. Although oil resistance is exerted even if agglomeration occurs, paper machines and coating machines may be contaminated with agglomerated substances. Further, when the obtained sheet material is used as a food packaging material, the agglomerate may be adhered to food. For this reason, when using the fatty acid modified by an epichlorohydrin-based chemical, it is preferable to add polyvinyl alcohol thereto in order to suppress generation of agglomerate. In this case, polyvinyl alcohol functions as protective colloid against the fatty acid and can prevent generation of agglomerate.

Further, when polyvinyl alcohol is used, the oil resistance of the sheet material can be improved.

When polyvinyl alcohol is added to the coating layer containing the fatty acid in order to prevent agglomeration, the polyvinyl alcohol is added thereto in a proportion of preferably 10 to 600% by weight, more preferably 20 to 500% by weight based on the weight of the fatty acid. When the proportion is less than 10% by weight, the effect of preventing agglomeration may not be sufficient. On the other hand, when the proportion is more than 600% by weight, the proportion of the hydrophobized starch and the fatty acid in the coating layer is decreased and the oil resistance of the sheet material tends to be decreased.

It has been already known that oil resistance can be improved by forming a coating layer obtained by adding a crosslinking agent for polyvinyl alcohol to polyvinyl alcohol on a sheet material. In this case, however, a certain amount of film of polyvinyl alcohol must be formed, and as a result, the resistance to air permeability of the sheet material is increased. On the contrary, when a coating layer to which polyvinyl alcohol is added to prevent generation of agglomerate as described above is formed on the sheet material, the resistance to air permeability of the sheet material is not increased. From this, it is assumed that polyvinyl alcohol for preventing generation of agglomerate produces oil resistance due to some action with the fatty acid without increasing the resistance to air permeability of the sheet material.

Polyvinyl alcohol may be added to the hydrophobized starch and the crosslinking agent without adding fatty acid thereto. In this case, oil resistance is improved, but attention should be paid because contamination of dryer may occur upon application of the coating using a size press.

When adding polyvinyl alcohol to the hydrophobized starch and the crosslinking agent, the polyvinyl alcohol is added in an amount of preferably less than 100% by weight based on the weight of the solid of the hydrophobized starch. When the proportion of polyvinyl alcohol is more than 100% by weight, the proportion of the hydrophobized starch in the coating layer is decreased and the oil resistance of the sheet material tends to be decreased.

In the present invention, two or more coating layers may be formed on one or both sides of the substrate. In this case, the following embodiments are considered. One embodiment has a structure in which a coating layer containing the hydrophobized starch and the crosslinking agent and a coating layer containing fatty acid as a main component or a coating layer containing polyvinyl alcohol as a main component are formed by lamination. Other embodiment has a structure in which a coating layer containing the hydrophobized starch, the crosslinking agent and fatty acid and/or polyvinyl alcohol and a coating layer containing fatty acid as a main component or a coating layer containing polyvinyl alcohol as a main component are formed by lamination.

The coating layer containing fatty acid as a main component specifically means that the coating layer contains 50% by weight or more of fatty acid based on the weight of the solid of the coating layer. Components other than fatty acid in this case include the afore-mentioned starch, polyvinyl alcohol, a crosslinking agent, and in addition, a surface sizing agent which influences impregnation of a coating solution and a surface strength agent for preventing paper dust. These typical coating agents may be added to the coating layer containing fatty acid as a main component within the limit that the properties are not damaged.

The coating layer containing polyvinyl alcohol as a main component specifically means that the coating layer contains 50% by weight or more of polyvinyl alcohol based on the weight of the solid of the coating layer. Components other than polyvinyl alcohol in this case include the afore-mentioned starch, fatty acid, fatty acid modified by an epichlorohydrin-based chemical, a fatty acid sizing agent, a crosslinking agent, and in addition, a surface sizing agent which influences impregnation of a coating solution and a surface strength agent for preventing paper dust. These typical coating agents may be added to the coating layer containing polyvinyl alcohol as a main component within the limit that the properties are not damaged.

When the coating layer containing the hydrophobized starch and the crosslinking agent and the layer containing fatty acid as a main component are separately formed, there is no agglomeration due to addition of fatty acid, and by the synergistic effect of these two coating layers, excellent oil resistance can be given to the sheet material.

In addition, by separately forming the coating layer containing fatty acid as a main component, a sheet material having extremely low resistance to air permeability and excellent in oil resistance can be obtained.

Further, by separately forming the coating layer containing polyvinyl alcohol as a main component, the sheet material tends to have a higher resistance to air permeability compared to the case of forming the coating layer containing fatty acid as a main component, but it has a better oil resistance than that of the case of forming the coating layer containing fatty acid as a main component. As herein described, by forming two separate coating layers, the balance between resistance to air permeability and oil resistance can be achieved. Thus, by forming the above-described various coating layers individually or in combination, an oil-resistant sheet material with properties suitable for purposes of use can be obtained.

In the embodiment in which the coating layer containing fatty acid as a main component is separately formed, it is preferred that the coating layer containing fatty acid as a main component is formed at a position farther from the substrate than the coating layer of the hydrophobized starch and the crosslinking agent or the coating layer of the hydrophobized starch, the crosslinking agent, fatty acid and/or polyvinyl alcohol. This further improves the oil resistance of the sheet material. In addition, by forming the coating layer containing fatty acid as a main component so as to be exposed to the surface of the sheet material, and when the sheet material is used as a food packaging material, the material also has an effect of preventing adhesion of skin of fried chicken and the like to the packaging material.

In an embodiment in which the coating layer containing polyvinyl alcohol as a main component is separately formed, the coating layer may be formed nearer to or farther from the substrate, or as the outermost layer. When the coating layer containing polyvinyl alcohol as a main component is formed nearer to the substrate, the layer functions to prevent permeation of a coating solution into the substrate, and this may increase the resistance to air permeability of the sheet material, but the oil resistance is increased. On the other hand, when the coating layer containing polyvinyl alcohol as a main component is formed farther from the substrate, the resistance to air permeability is low but the oil resistance may be low. In addition, when the coating layer containing polyvinyl alcohol as a main component is formed as an outermost layer, slipperiness due to fatty acid described above can be decreased.

Taking the characteristics described above into consideration, the position of the coating layer containing fatty acid as a main component or the coating layer containing polyvinyl alcohol as a main component may be determined depending on the purpose of use of the sheet material.

Polyvinyl alcohol added to the coating layer or used for the coating layer containing polyvinyl alcohol as a main component may be completely saponified or partially saponified. Polyvinyl alcohol may be modified by a carboxyl group or a cyanol group. For imparting oil resistance, it is preferred that polyvinyl alcohol is modified by a carboxyl group or a cyanol group.

In addition, to impart particular properties such as heat sealing properties to the oil-resistant sheet material of the present invention, a layer of heat sealing agent or other layers suitable for required properties may be additionally formed.

In the present invention, conventional chemicals for papermaking may be added to the coating layer within the limit that the properties are not damaged. For example, a surface sizing agent, a dryer release agent, an antifoaming agent, a surface strength agent or an antistatic agent may be added to the coating layer depending on purposes.

As a method of forming the coating layer on the substrate in the present invention, useful are on-machine coaters such as a size press coater, a gate roll coater, a billblade coater and a rod and blade metering coater; off-machine coaters such as an air knife coater, a roll coater, a reverse roll coater, a bar coater, a rod coater, a blade coater, a curtain coater, a gravure coater, a die slot coater and a short dwell coater; and in addition, a coater integrated with a paper machine, a dipping machine and various printing machines. Taking an advantage of the cost, on-machine types are preferably used.

The substrate on which the coating layer is formed is not particularly limited, but in consideration of the resistance to air permeability, a sheet material comprising vegetable fiber as a main component is preferred.

Examples of vegetable fiber used for the substrate include wood pulp, non-wood pulp, synthetic pulp, synthetic fiber and inorganic fiber, and these may be used alone or in an appropriate combination.

When using papermaking pulp, the beating degree is preferably 100 to 500 ml in Canadian Standard Freeness. When the beating degree is lower than 100 ml, freeness on a machine wire becomes poor upon manufacturing paper, and this leads to remarkable decrease in production efficiency. In addition, because the density of paper becomes too high, the resistance to air permeability tends to be high. When the beating degree is 500 ml or more, sufficient oil resistance may not be obtained.

As an auxiliary substance for papermaking, commonly used auxiliary substances for papermaking may be used. In particular, when guar gum, fatty acid, a water resistant additive or aluminum sulfate is used as an internal additive, the oil resistance of paper is improved and as combined with the coating layer of the present invention, excellent oil resistance can be achieved.

In the present invention, the coating layer containing the pre-determined components is formed on the substrate, and in addition, the hydrophobized starch may be incorporated into the substrate itself, whereby the oil resistance of the sheet material can be further improved. The content of the hydrophobized starch in this case is preferably 1 to 15% by weight based on the total weight of the substrate. When the content is less than 1% by weight, there may be no sufficient effect, and even when the hydrophobized starch is contained in a proportion of more than 15% by weight, the oil resistance is not increased, and this is disadvantageous in terms of the cost. In the case of a paper substrate, when a papermaking material contains a large amount of starch which is a hydrophilic component, freeness in paper making process becomes poor and the productivity is significantly reduced. In addition to the hydrophobized starch, other auxiliary substances for papermaking or chemicals for improving oil resistance such as guar gum and fatty acid may also be added together to the papermaking material.

The description hereinbefore illustrates embodiments of a sheet material in which the coating layer containing pre-determined components is formed on the substrate. In the present invention, however, oil resistance can be imparted to a sheet material not by forming the coating layer containing pre-determined components but by internally adding the components to the substrate. In other words, an oil-resistant sheet material of the present invention can also be obtained by internal addition of the hydrophobized starch, the crosslinking agent and fatty acid to the substrate. Here, the internal addition means to add these components to the raw material of the sheet material to be formed into a sheet.

The proportion of the hydrophobized starch to be added is preferably 1 to 15% by weight based on the total weight of the solid of the raw material. When the proportion is less than 1% by weight, the effect may not be sufficient, and even when the hydrophobized starch is added in a proportion of more than 15% by weight, the addition produces no further effect and freeness tends to be significantly deteriorated.

The proportion of the crosslinking agent to be added is preferably 0.1 to 10% by weight based on the total weight of the solid of the raw material. When the proportion is less than 0.1% by weight, the effect may not be sufficient, and even when the crosslinking agent is added in a proportion of more than 10% by weight, the addition produces no further effect and is disadvantageous in terms of the cost.

The proportion of fatty acid to be added is preferably 0.1 to 10% by weight based on the total weight of the solid of the raw material. When the proportion is less than 0.1% by weight, no effect is produced, and even when the fatty acid is added in a proportion of more than 10% by weight, the addition produces no further effect and the surface of the sheet material tends to be slippery.

EXAMPLES

Example 1

50% by weight of hardwood bleached kraft pulp produced from an aspen material and 50% by weight of softwood bleached kraft pulp were used as wood pulp and beaten to a beating degree of 350 ml in Canadian Standard Freeness with a double disk refiner to prepare a raw material pulp slurry. To the raw material pulp slurry were added an epichlorohydrin-based wet strength agent in a proportion of 0.5% by weight on a solid concentration basis relative to the weight of the pulp, a rosin sizing agent in a proportion of 0.5% by weight on a solid concentration basis relative to the weight of the pulp and aluminum sulfate in a proportion of 4% by weight to prepare a raw material slurry. The raw material slurry was formed into a sheet of a basis weight of 42 $g/m^2$ using a Fourdrinier paper machine.

Hydrophobized starch produced by reacting starch with organic acid anhydride is mixed with a polyamide-epichlorohydrin resin as a crosslinking agent in a proportion of 10% by weight on a solid concentration basis relative to the weight of the hydrophobized starch to prepare a coating solution. The coating solution was manually applied to both sides of the paper substrate prepared above so that the total amount of coating layers on both sides by this coating solution was 3.0 g/m² to prepare an oil-resistant sheet material having a basis weight of 45 g/m².

Example 2

An oil-resistant sheet material having a basis weight of 45 g/m² was prepared in the same manner as in Example 1 except that fatty acid (containing palmitic acid as a main component, melting point 63 to 64° C.) cationized by a polyamine-based chemical and epoxidized was added to the coating solution in a proportion of 10% by weight on a solid concentration basis relative to the weight of the hydrophobized starch.

Example 3

An oil-resistant sheet material having a basis weight of 45 g/m² was prepared in the same manner as in Example 2 except that carboxyl modified polyvinyl alcohol having a saponification degree of 93 to 95% and a polymerization degree of 2000 was added to the coating solution in a proportion of 300% by weight based on the weight of fatty acid.

Example 4

The coating solution obtained in Example 1 was manually applied to both sides of the paper substrate obtained in Example 1 so that the total amount of coating layers on both sides was 2.5 g/m². Further, a coating solution containing only fatty acid modified by epichlorohydrin was applied onto the above-described coating layers so that the total amount of coating layers of this coating solution on both sides was 0.5 g/m² to prepare an oil-resistant sheet material having a basis weight of 45 g/m².

Example 5

50% by weight of hardwood bleached kraft pulp produced from an aspen material and 50% by weight of softwood bleached kraft pulp were used as wood pulp and beaten to a beating degree of 250 ml in Canadian Standard Freeness with a double disk refiner to prepare a raw material pulp slurry. To the raw material pulp slurry were added hydrophobized starch produced by reacting starch with organic acid anhydride in a proportion of 5% by weight on a solid concentration basis relative to the weight of the pulp, an epichlorohydrin-based wet strength agent in a proportion of 0.5% by weight on a solid concentration basis relative to the weight of the pulp and aluminum sulfate in a proportion of 4% by weight to prepare a raw material slurry. The raw material slurry was formed into a sheet of a basis weight of 42 g/m² using a Fourdrinier paper machine.

Hydrophobized starch produced by reacting starch with organic acid anhydride is mixed with a polyamide-epichlorohydrin resin as a crosslinking agent in a proportion of 10% by weight on a solid concentration basis relative to the weight of the hydrophobized starch to prepare a coating solution. The coating solution was manually applied to both sides of the paper substrate prepared above so that the total amount of coating layers on both sides by this coating solution was 3.0 g/m² to prepare an oil-resistant sheet material having a basis weight of 45 g/m².

Example 6

An oil-resistant sheet material having a basis weight of 45 g/m² was prepared in the same manner as in Example 5 except that a fatty acid sizing agent (fatty acid containing palmitic acid as a main component, melting point 63 to 64° C.) cationized by a polyamine-based chemical and epoxidized was added to the coating solution in a proportion of 5% by weight based on the weight of the solid of the coating solution.

Example 7

The coating solution obtained in Example 6 (coating solution A) was manually applied to both sides of the paper substrate obtained in Example 5 so that the total amount of coating layers on both sides was 1.5 g/m². Further, a coating solution (coating solution B) containing only unmodified polyvinyl alcohol having a saponification degree of 93 to 95% and a polymerization degree of 2000 was applied onto the above-described coating layers so that the total amount of coating layers of this coating solution on both sides was 1.5 g/m² to prepare an oil-resistant sheet material of 45 g/m².

Example 8

An oil-resistant sheet material having a basis weight of 45 g/m² was prepared in the same manner as in Example 7 except that polyamide-epichlorohydrin resin was added as a crosslinking agent to the coating solution B in a proportion of 10% by weight on a solid concentration basis relative to the weight of the polyvinyl alcohol.

Example 9

An oil-resistant sheet material having a basis weight of 45 g/m² was prepared in the same manner as in Example 8 except that fatty acid sizing agent (fatty acid containing palmitic acid as a main component, melting point 63 to 64° C.) cationized by a polyamine-based chemical and epoxidized was added to the coating solution B in a proportion of 25% by weight on a solid concentration basis relative to the weight of the polyvinyl alcohol.

Example 10

An oil-resistant sheet material having a basis weight of 45 g/m² was prepared in the same manner as in Example 9 except that the coating solution B was applied to the paper substrate and then the coating solution A was applied thereto.

Example 11

An oil-resistant sheet material having a basis weight of 45 g/m² was prepared in the same manner as in Example 6 except that fatty acid (containing brassidic acid as a main component, melting point 61.5° C.) was used instead of the fatty acid sizing agent cationized by a polyamine-based chemical and epoxidized.

Example 12

An oil-resistant sheet material having a basis weight of 45 g/m² was prepared in the same manner as in Example 11 except that fatty acid (containing brassidic acid as a main component) cationized by a polyamine-based chemical and epoxidized was used instead of the fatty acid (containing brassidic acid as a main component).

Example 13

An oil-resistant sheet material having a basis weight of 45 g/m² was prepared in the same manner as in Example 1 except that hydrophobized starch produced by closely contacting starch with an aqueous solution of organosilane in the presence of alkali aluminate was used instead of the hydrophobized starch produced by reacting starch with organic acid anhydride.

Example 14

An oil-resistant sheet material having a basis weight of 45 g/m$^2$ was prepared in the same manner as in Example 11 except that fatty acid (containing stearic acid as a main component, melting point 71.5 to 72° C.) cationized by a polyamine agent and epoxidized was used instead of the fatty acid (containing brassidic acid as a main component).

Example 15

50% by weight of hardwood bleached kraft pulp produced from an aspen material and 50% by weight of softwood bleached kraft pulp were used as wood pulp and beaten to a beating degree of 250 ml in Canadian Standard Freeness with a double disk refiner to prepare a raw material pulp slurry. To the raw material pulp slurry were added hydrophobized starch produced by reacting starch with organic acid anhydride in a proportion of 5% by weight on a solid concentration basis relative to the weight of the pulp, a fatty acid sizing agent in a proportion of 0.5% by weight on a solid concentration basis relative to the weight of the pulp, an epichlorohydrin-based crosslinking agent in a proportion of 0.5% by weight on a solid concentration basis relative to the weight of the pulp, and aluminum sulfate in a proportion of 4% by weight to prepare a raw material slurry. The raw material slurry was formed into a sheet of a basis weight of 45 g/m$^2$ using a Fourdrinier paper machine to prepare an oil-resistant sheet material.

Example 16

An oil-resistant sheet material having a basis weight of 45 g/m$^2$ was prepared in the same manner as in Example 11 except that fatty acid (containing lauric acid as a main component, melting point 44° C.) cationized by a polyamine-based chemical and epoxidized was used instead of the fatty acid (containing brassidic acid as a main component).

Comparative Example 1

A coating solution containing only hydrophobized starch produced by reacting starch with organic acid anhydride was applied to both sides of the paper substrate prepared in Example 1 so that the total amount of coating layers of this coating solution on both sides was 3.0 g/m$^2$ to prepare an oil-resistant sheet material having a basis weight of 45 g/m$^2$.

Comparative Example 2

A coating solution containing only fatty acid modified by epichlorohydrin was applied to both sides of the paper substrate prepared in Example 1 so that the total amount of coating layers of this coating solution on both sides was 3.0 g/m$^2$ to prepare an oil-resistant sheet material having a basis weight of 45 g/m$^2$.

Comparative Example 3

An oil-resistant sheet material having a basis weight of 67 g/m$^2$ was prepared in the same manner as in Example 1 except that the coating solution was applied so that the total amount of coating layers on both sides was 25 g/m$^2$.

Comparative Example 4

An oil-resistant sheet material having a basis weight of 45 g/m$^2$ was prepared by laminating a polyethylene film having a thickness of 4 m on one side of the paper substrate prepared in Example 1.

Comparative Example 5

An oil-resistant sheet material having a basis weight of 45 g/m$^2$ was prepared in the same manner as in Example 1 except that oxidized starch was used instead of the hydrophobized starch.

Comparative Example 6

An oil-resistant sheet material having a basis weight of 45 g/m$^2$ was prepared in the same manner as in Example 1 except that starch phosphate was used instead of the hydrophobized starch.

Comparative Example 7

An oil-resistant sheet material having a basis weight of 45 g/m$^2$ was prepared in the same manner as in Example 1 except that carboxyl modified polyvinyl alcohol having a saponification degree of 93 to 95% and a polymerization degree of 2000 was used instead of the hydrophobized starch.

Table 1 shows evaluation results of properties of the oil-resistant sheet materials obtained in the above Examples and Comparative Examples. Oil resistance, moisture permeability, hot water resistance and breakage of package were evaluated according to the following methods.

Hot water resistance may not be required in some applications of oil-resistant sheets and therefore was evaluated as reference. Thus, an oil-resistant sheet material with acceptable levels of oil resistance, moisture permeability and breakage of package are evaluated as a "pass".

<Evaluation Test of Oil Resistance>

The oil resistance was evaluated by dropping 0.5 ml of castor oil on an oil-resistant sheet material, applying a load of 5 g/cm$^2$ to the castor oil dropped surface (a metal plate was used for application of load), observing the reverse side of the castor oil dropped surface and measuring the time until the dropped castor oil permeated to the reverse side. The maximum measurement time was set to 24 hours and the permeation of dropped castor oil to the reverse side was visually observed after a pre-determined time of the treatment. The evaluation criteria of permeation of castor oil are as follows. "Δ" and higher marks are ranked as a "pass".

⊚: Substantially no permeation of castor oil is observed on the reverse side of the castor oil dropped surface after 24 hours of dropping.

○: Permeation of castor oil is observed on the reverse side of the castor oil dropped surface between 12 to 24 hours of dropping.

Δ: Permeation of castor oil is observed on the reverse side of the castor oil dropped surface between 6 to 12 hours of dropping.

X: Permeation of castor oil is observed on the reverse side of the castor oil dropped surface within 6 hours of dropping.

<Evaluation Test of Moisture Permeability>

100 ml of boiling water was put in a beaker and a bag-shaped sample of an oil-resistant sheet material was put over the top of the beaker. The beaker was left for 1 hour and dew condensation to the inside of the bag was visually observed. The evaluation criteria of dew condensation were as follows. "Δ" and higher marks are ranked as a "pass".

⊚: No dew condensation was found inside the bag after leaving 1 hour.
○: Little dew condensation was found inside the bag after leaving 1 hour.
Δ: Dew condensation was found all over the inside of the bag after leaving 1 hour, but no droplet was formed.
X: Dew condensation was found inside the bag after leaving 1 hour and droplets were formed.

<Evaluation Test of Hot Water Resistance>

The hot water resistance was evaluated by a method in which a sample of an oil-resistant sheet material was cut into a square piece having each side of 5 cm and extraction was performed in 100 ml of hot water for 10 minutes, and then the extract solution was evaporated to measure evaporation residue. Regarding the test result, a total extract amount of 2 mg/25 cm² or less was evaluated as "○" and a total extract amount of more than this value was evaluated as "X".

<Evaluation Test of Breakage of Package>

A bag of an oil-resistant sheet material having a size of 8 cm×14 cm and provided with an open part for putting a sponge on one end was prepared. A sponge having a size of 5 cm×7 cm×4 cm impregnated with 20 ml of water was put in the bag. The open part of the bag was folded twice and sealed at one central point with scotch tape. The bag was then put in an electronic oven of an output of 800 W to be heated for 5 minutes, and whether the bag was broken or not was observed. The evaluation criteria are as follows.

⊚: Bag was not broken and scotch tape was not peeled off.
X: Bag was broken or scotch tape was peeled off.

INDUSTRIAL APPLICABILITY

According to the present invention, an oil-resistant sheet material having low resistance to air permeability, harmless to humans and excellent in oil resistance and productivity can be obtained. The oil-resistant sheet material of the present invention is particularly suitable for use as a packaging material for food containing edible oil.

The invention claimed is:

1. An oil-resistant sheet material wherein at least one coating layer containing a hydrophobized starch and a crosslinking agent for crosslinking the hydrophobized starch and a fatty acid is formed on at least one side of a substrate in an amount of 0.5 to 20 g/m², and wherein the fatty acid is added to the coating layer in a solid content of 1 to 50% by weight based on the total weight of the solid of the coating layer.

2. The oil-resistant sheet material according to claim 1, wherein the coating layer further contains polyvinyl alcohol.

3. The oil-resistant sheet material according to claim 1, which comprises at least two coating layers comprising a first coating layer containing a hydrophobized starch and a crosslinking agent for crosslinking the hydrophobized starch and a fatty acid in an amount of 0.5 to 20 g/m², wherein the fatty acid is added to the coating layer in a solid content of 1 to 50% by weight based on the total weight of the solid of the coating layer, and a second coating layer containing polyvinyl alcohol as a main component are formed on at least one side of the substrate.

4. The oil-resistant sheet material according to claim 1, which comprises at least two coating layers comprising a first coating layer containing a hydrophobized starch and a crosslinking agent for crosslinking the hydrophobized starch and a fatty acid in an amount of 0.5 to 20 g/m², wherein the fatty acid is added to the coating layer in a solid content of 1 to 50% by weight based on the total weight of the solid of the coating layer, and a second coating layer containing fatty acid as a main component are formed on at least one side of the substrate.

TABLE 1

|  | basis weight (g/m²) | thickness (mm) | density (g/m³) | oil resistance | moisture permeability | hot water resistance | breakage of bag |
|---|---|---|---|---|---|---|---|
| Ex. 1 | 45.2 | 0.071 | 0.63 | ○ | Δ | ○ | ○ |
| Ex. 2 | 45.8 | 0.074 | 0.62 | ⊚ | ○ | ○ | ○ |
| Ex. 3 | 44.4 | 0.076 | 0.58 | ⊚ | ○ | ○ | ○ |
| Ex. 4 | 44.7 | 0.076 | 0.59 | ○ | ⊚ | ○ | ○ |
| Ex. 5 | 45.3 | 0.070 | 0.65 | ○ | Δ | ○ | ○ |
| Ex. 6 | 45.2 | 0.068 | 0.66 | ⊚ | ○ | ○ | ○ |
| Ex. 7 | 45.5 | 0.070 | 0.65 | ○ | ⊚ | X | ○ |
| Ex. 8 | 45.1 | 0.067 | 0.67 | ○ | ○ | ○ | ○ |
| Ex. 9 | 45.5 | 0.069 | 0.66 | ⊚ | ⊚ | ○ | ○ |
| Ex. 10 | 45.3 | 0.071 | 0.63 | ⊚ | ○ | ○ | ○ |
| Ex. 11 | 45.2 | 0.071 | 0.64 | ○ | ○ | ○ | ○ |
| Ex. 12 | 45.1 | 0.073 | 0.62 | ⊚ | ○ | ○ | ○ |
| Ex. 13 | 45.1 | 0.070 | 0.64 | ○ | Δ | ○ | ○ |
| Ex. 14 | 45.0 | 0.072 | 0.63 | ⊚ | ○ | ○ | ○ |
| Ex. 15 | 45.3 | 0.072 | 0.63 | Δ | ⊚ | ○ | ○ |
| Ex. 16 | 45.1 | 0.075 | 0.60 | ⊚ | ○ | ○ | ○ |
| Com. Ex. 1 | 45.2 | 0.075 | 0.60 | X | Δ | X | ○ |
| Com. Ex. 2 | 45.0 | 0.073 | 0.62 | X | ⊚ | ○ | ○ |
| Com. Ex. 3 | 67.1 | 0.108 | 0.62 | Δ | X | X | X |
| Com. Ex. 4 | 45.8 | 0.075 | 0.61 | ⊚ | X | ○ | X |
| Com. Ex. 5 | 45.3 | 0.072 | 0.63 | X | Δ | ○ | ○ |
| Com. Ex. 6 | 45.2 | 0.070 | 0.65 | X | Δ | ○ | ○ |
| Com. Ex. 7 | 45.1 | 0.070 | 0.64 | Δ | X | ○ | X |

5. The oil-resistant sheet material according to claim 4, wherein the coating layer containing a hydrophobized starch is disposed nearer to the surface and the coating layer containing fatty acid is disposed farther from the substrate.

6. The oil-resistant sheet material according to claim 1, wherein the substrate contains a hydrophobized starch in a proportion of 1 to 15% by weight based on the total weight of the substrate.

7. The oil-resistant sheet material according to claim 1, wherein the crosslinking agent is an epichlorohydrin-group containing crosslinking agent.

8. The oil-resistant sheet material according to claim 1, wherein the fatty acid is a fatty acid sizing agent.

9. The oil-resistant sheet material according to claim 1, wherein the fatty acid is modified by an epichlorohydrin-group containing chemical.

10. The oil-resistant sheet material according to claim 1, wherein the fatty acid is added to the coating layer in a solid content of 3 to 15% by weight based on the total weight of the solid of the coating layer.

\* \* \* \* \*